US007829816B2

(12) United States Patent
Duan et al.

(10) Patent No.: US 7,829,816 B2

(45) Date of Patent: Nov. 9, 2010

(54) PLASMA ARC TORCH PROVIDING ANGULAR SHIELD FLOW INJECTION

(75) Inventors: Zheng Duan, Hanover, NH (US); Stephen M. Liebold, Grantham, NH (US); Aaron D. Brandt, Grantham, NH (US)

(73) Assignee: Hypertherm, Inc., Hanover, NH (US)

( * ) Notice: Subject to any disclaimer, the term of this patent is extended or adjusted under 35 U.S.C. 154(b) by 1185 days.

(21) Appl. No.: 11/407,370

(22) Filed: Apr. 19, 2006

(65) Prior Publication Data

US 2007/0007256 A1 Jan. 11, 2007

Related U.S. Application Data

(60) Provisional application No. 60/672,777, filed on Apr. 19, 2005.

(51) Int. Cl.
*B23K 10/00* (2006.01)

(52) U.S. Cl. .............................. 219/121.5; 219/121.51; 219/75; 219/121.48

(58) Field of Classification Search ............ 219/121.36, 219/121.48, 121.5, 121.51, 121.52, 121.39, 219/75

See application file for complete search history.

(56) References Cited

U.S. PATENT DOCUMENTS 5,079,403 A * 1/1992 Sturges et al. ............ 219/121.5
5,111,656 A * 5/1992 Simon et al. ............... 60/203.1
5,164,568 A 11/1992 Sanders
5,202,544 A * 4/1993 Inoue et al. .............. 219/121.5
5,208,448 A 5/1993 Everett .................... 219/121.5
5,451,739 A 9/1995 Nemchinsky et al.
5,591,356 A 1/1997 Sakuragi et al.
5,653,895 A 8/1997 Shintani
6,020,572 A * 2/2000 Marner et al. .......... 219/121.52
6,118,097 A 9/2000 Kaga et al.
6,172,323 B1 1/2001 Ishide et al.
6,207,923 B1 3/2001 Lindsay
6,610,959 B2 8/2003 Carlson et al.
6,667,459 B1 12/2003 Woods et al.
6,774,336 B2 8/2004 Horner-Richardson et al.
6,924,004 B2 8/2005 Rao et al.
2001/0025833 A1 10/2001 Kelkar et al. ............. 219/121.5
2002/0150669 A1 10/2002 Pui et al.
2004/0177807 A1 9/2004 Pui et al.
2005/0082263 A1 4/2005 Koike et al.

FOREIGN PATENT DOCUMENTS

DE 4407913 10/1994
EP 0941018 9/1999
WO WO 03/089178 10/2003

* cited by examiner

*Primary Examiner*—Mark H Paschall
(74) *Attorney, Agent, or Firm*—Proskauer Rose LLP

(57) ABSTRACT

Plasma arc torches described herein include a torch tip with an improved nozzle that provides angular shield flow injection. In particular, the nozzle provides angular/conical impingement of a fluid (e.g., a shield gas) on an ionized plasma gas flowing through a plasma arc torch. Some of the torch tips described herein include a nozzle with a conical external shape combined with a shield with complementing internal geometry to form the angular fluid flow. As a result, a plasma arc torch including the improved nozzle have the benefits of a stabilized ionized plasma gas flow together with enhanced nozzle cooling and protection from reflecting slag during torch use.

44 Claims, 7 Drawing Sheets

PLASMA ARC TORCH PROVIDING ANGULAR SHIELD FLOW INJECTION

RELATED APPLICATIONS

This application claims the benefit of the filing date of U.S. Provisional Patent Application Ser. No. 60/672,777, filed on Apr. 19, 2005, entitled "Plasma Arc Torch Providing Angular Shield Flow Injection" by Duan et al., the entirety of which is incorporated herein by reference.

FIELD OF THE INVENTION

The invention generally relates to plasma arc torches used for cutting, piercing, and marking metal, and more particularly to plasma arc torches that provide angular (e.g., conical) shield flow injection to a plasma arc.

BACKGROUND OF THE INVENTION

Plasma arc torches are widely used in the cutting, piercing, and/or marking of metallic materials (e.g., elemental metals, metal alloys). A plasma arc torch generally includes an electrode mounted within a body of the torch (i.e., a torch body), a nozzle having an exit orifice also mounted within the torch body, electrical connections, fluid passageways for cooling fluids, shielding fluids, and arc control fluids, a swirl ring to control fluid flow patterns in a plasma chamber formed between the electrode and nozzle, and a power supply. The torch produces a plasma arc, which is a constricted ionized jet of a plasma gas with high temperature and high momentum (i.e., an ionized plasma gas flow stream). Gases used in the plasma arc torch can be non-oxidizing (e.g., argon, nitrogen) or oxidizing (e.g., oxygen, air).

In operation, a pilot arc is first generated between the electrode (i.e., cathode) and the nozzle (i.e., anode). Generation of the pilot arc may be by means of a high frequency, high voltage signal coupled to a DC power supply and the plasma arc torch, or any of a variety of contact staring methods.

In general, the electrode, nozzle, and fluid passageways are configured in relation to one another to provide a plasma arc for cutting, piercing, or marking metallic materials. Referring to FIG. 1, in one known configuration, a plasma arc torch includes an electrode 1 and a nozzle 2 mounted in spaced relationship with a shield 3 to form one or more passageways for fluids (e.g., shield gas) to pass through a space disposed between the shield and the nozzle. In this known configuration, plasma gas flow 4 passes through the torch along the torch's longitudinal axis (e.g., about the electrode, through the nozzle, and out through the nozzle exit orifice). The shield gas 5 or other fluid passes through the one or more passageways to cool the nozzle and impinges the ionized plasma gas flow at a 90 degree angle as the plasma gas flow passes through the nozzle exit orifice. As a result of the impingement, the ionized plasma gas flow can be disrupted (e.g., generating instabilities in the plasma gas flow), which may lead to degraded cutting, piercing, or marking performance.

Referring to FIG. 2, in another known configuration, the nozzle 2 and the shield 3 can be mounted to provide substantially columnar flow of the shield gas 5 and the ionized plasma gas 4. That is, instead of impinging the ionized plasma gas flow 4 as it exits the nozzle exit orifice at a 90 degree angle, the shield gas 5 is injected out of the passageways in a parallel direction to the plasma gas flow (i.e., columnar flow) as described in U.S. Pat. No. 6,207,923 issued to Lindsay. Plasma arc torches having this configuration experience improved stability over torches that have a shield gas flow 5 that impinges the plasma gas flow 4 at a 90 degree angle. In addition, plasma arc torches that include columnar flow tend to have a large (e.g., greater than 2.4) nozzle exit orifice length to diameter ratio, L/D. Some researchers have found that a large L/D ratio will lead to the ability to cut thicker metallic workpieces and to achieve faster cutting speeds. However, in general, plasma arc torches that have substantially columnar flow of the shield gas and the plasma gas have difficulty cooling the tip of the nozzle and provide less protection from reflecting slag during cutting than plasma arc torches which use 90 degree impinging shield gas flow injection.

Thus, it would be desirable to provide a plasma arc torch which could achieve effective cooling of the nozzle and provide protection from reflecting slag while also providing a stable plasma gas flow and a large L/D ratio.

SUMMARY OF THE INVENTION

The invention, in one embodiment, remedies the deficiencies of the prior art by providing a plasma arc torch that provides effective cooling of the torch's nozzle and protection from slag reflection while also providing stable plasma gas flow. The plasma arc torch of the present invention can be used to cut, pierce and/or mark metallic materials. The torch includes a torch body having a nozzle mounted relative to an electrode in the body to define a plasma chamber. The torch body includes a plasma flow path for directing a plasma gas to the plasma chamber. The torch also includes a shield attached to the torch body. The nozzle, electrode, and shield are consumable parts that wear out and require periodic replacement. Thus, these parts are detachable and, in some embodiments, re-attachable so that these parts can be easily removed, inspected for wear, and replaced.

In one aspect, the invention features a nozzle for a plasma arc torch. The nozzle includes a nozzle body including a substantially hollow interior and a substantially conical exterior portion. The substantially conical exterior portion having a nozzle half-cone angle selected from a first range of about 20 degrees to about 60 degrees. The nozzle body defines an exit orifice, which is disposed on an end face of the nozzle. The exit orifice is defined by an orifice diameter (D), an orifice length (L), and a nozzle end face diameter ($\phi$1), wherein a L to D ratio is greater than or equal to 2.4, and a $\phi$1 to D ratio is within a second range of about 1.9 to 2.5.

Embodiments of this aspect of the invention can include one or more of the following features. In some embodiments, the first range is between about 30 degrees to about 50 degrees. In certain embodiments, the first range is between about 34 degrees to about 44 degrees, such as, for example, 42.5 degrees. The L to D ratio, in some embodiments, is between about 2.5 and about 3.0, such as for example, 2.8. In some embodiments, the $\phi$1 to D ratio is about 2.1. The nozzle body of the present invention can further include a securing mechanism for securing the nozzle body to a plasma torch body. Examples of securing mechanisms include o-rings and threads. In certain embodiments, the nozzle body is formed from an electrically conductive material, such as, for example, copper, aluminum, or brass.

In another aspect, the invention features a torch tip for a plasma arc torch. The torch tip has a longitudinal axis and includes a nozzle and a shield. The nozzle of the torch tip includes a nozzle body including a substantially hollow interior and a substantially conical exterior portion. The substantially conical exterior portion has a nozzle half-cone angle selected from a first range of about 20 degrees to about 60 degrees. The nozzle body defines an exit orifice disposed on an end face of the nozzle. The exit orifice is defined by an orifice diameter (D), an orifice length (L), and a nozzle end face diameter (ϕ1), wherein a L to D ratio is greater than or equal to 2.4. The shield of the torch tip includes a shield body defining a shield exit orifice having a shield exit orifice diameter (ϕ2). The shield body includes a substantially conical interior portion that has a shield half-cone angle, which is substantially equal to the nozzle half-cone angle. The shield being mounted in a spaced relation to the nozzle relative to the longitudinal axis of the torch tip such that a fluid passageway is formed in a space between the substantially conical interior portion of the shield and the substantially conical exterior portion of the nozzle.

Embodiments of this aspect can include one or more of the following features. In some embodiments, the shield is spaced along the longitudinal axis from the nozzle at a distance (s) and the passageway has a thickness defined by s multiplied by sine of the nozzle half-cone angle. In certain embodiments a value of s is selected to provide a thickness of the passageway that results in a shield exit fluid velocity of about 2,000 inches per second to about 6,000 inches per second. In some embodiments, the value of s is selected to provide a thickness of about 0.022 inches. The nozzle can have a ϕ1 to D ratio within a range of about 1.9 to about 2.5, such as for example, 2.1. The first range (i.e., the range of the nozzle half-cone angle), in some embodiments, can be between about 30 degrees to about 50 degrees. In other embodiments, the first range is between about 34 degrees to about 44 degrees, such as for example 42.5 degrees. The L to D ratio can be between about 2.5 and about 3.0, such as, for example, 2.8. The torch tip can include a ϕ2 to ϕ1 ratio within a range of about 0.8 to about 1.2. In certain embodiments, the ϕ2 to ϕ1 ratio is greater than 1. In some embodiments, the shield includes one or more vent holes. In certain embodiments, the shield does not include any vent holes. The shield as well as the nozzle can be formed of an electrically conducting material. In certain embodiments, the nozzle body further includes a securing mechanism for securing the nozzle body to a plasma torch body.

In another aspect, the invention features a plasma arc torch. The plasma arc torch has a longitudinal axis and includes a plasma arc torch body, a nozzle, and a shield. The plasma arc torch body includes a plasma flow path for directing a plasma gas to a plasma chamber in which a plasma arc is formed. The nozzle includes a nozzle body including a substantially hollow interior and a substantially conical exterior portion. The substantially conical exterior portion has a nozzle half-cone angle selected from a first range of about 20 degrees to about 60 degrees. The nozzle body defines an exit orifice disposed on an end face of the nozzle. The exit orifice is defined by an orifice diameter (D), an orifice length (L), and a nozzle end face diameter (ϕ1), wherein a L to D ratio is greater than or equal to 2.4. The shield includes a shield body defining a shield exit orifice having a shield exit orifice diameter (ϕ2). The shield body includes a substantially conical interior portion that has a shield half-cone angle, which is substantially equal to the nozzle half-cone angle. The shield being mounted in a spaced relation to the nozzle relative to the longitudinal axis of the plasma arc torch such that a fluid passageway is formed in a space between the substantially conical interior portion of the shield and the substantially conical exterior portion of the nozzle.

Embodiments of this aspect can include one or more of the following features. In some embodiments, the shield is spaced along the longitudinal axis from the nozzle at a distance (s) and the passageway has a thickness defined by s multiplied by sine of the nozzle half-cone angle. In certain embodiments a value of s is selected to provide a thickness of the passageway that results in a shield exit fluid velocity of about 2,000 inches per second to about 6,000 inches per second. In some embodiments, the value of s is selected to provide a thickness of about 0.022 inches. The nozzle can have a ϕ1 to D ratio within a range of about 1.9 to about 2.5, such as for example, 2.1. The first range (i.e., the range of the nozzle half-cone angle), in some embodiments, can be between about 30 degrees to about 50 degrees. In other embodiments, the first range is between about 34 degrees to about 44 degrees, such as for example 42.5 degrees. The L to D ratio can be between about 2.5 and about 3.0, such as, for example, 2.8. The plasma arc torch can include a ϕ2 to ϕ1 ratio within a range of about 0.8 to about 1.2. In certain embodiments, the ϕ2 to ϕ1 ratio is greater than 1. In some embodiments, the shield includes one or more vent holes. In certain embodiments the shield does not include any vent holes. The shield as well as the nozzle can be formed of an electrically conducting material. In certain embodiments, the nozzle body further includes a securing mechanism for securing the nozzle body to a plasma torch body.

In another aspect, the invention features a nozzle for a plasma arc torch. The nozzle includes a nozzle body including a substantially hollow interior and a substantially conical exterior portion having a nozzle half-cone angle. The nozzle body defines an exit orifice disposed on an end face of the nozzle. The exit orifice is defined by an orifice diameter (D), an orifice length (L), and a nozzle end face diameter (ϕ1), wherein the nozzle half-cone angle, a L to D ratio, and a ϕ1 to D ratio are selected to provide the plasma arc torch with effective cooling of the nozzle, protection from slag reflection, and a stable ionized plasma gas flow.

In another aspect, the invention features a torch tip for a plasma arc torch. The torch tip has a longitudinal axis and includes a nozzle and a shield. The nozzle includes a nozzle body including a substantially hollow interior and a substantially conical exterior portion having a nozzle half-cone angle. The nozzle body defines an exit orifice disposed on an end face of the nozzle. The exit orifice is defined by an orifice diameter (D), an orifice length (L), and a nozzle end face diameter (ϕ1). The shield includes a shield body defining a shield exit orifice diameter (ϕ2). The shield body includes a substantially conical interior portion having a shield half-cone angle, which is substantially equal to the nozzle half-cone angle. The shield is mounted in a spaced relation to the nozzle relative to the longitudinal axis such that a fluid passageway is formed in a space between the substantially conical interior portion of the shield and the substantially conical exterior portion of the nozzle. The nozzle half-cone angle, a L to D ratio, and a ϕ2 to ϕ1 ratio are selected to provide the plasma arc torch with effective cooling of the nozzle, protection from slag reflection, and a stable ionized plasma gas flow.

In another aspect, the invention features a plasma arc torch including a longitudinal axis. The plasma arc torch includes a plasma arc torch body, a nozzle, and a shield. The plasma arc torch body includes a plasma flow path for directing a plasma gas to a plasma chamber in which a plasma arc is formed. The nozzle is mounted relative to an electrode in the plasma torch body to define a plasma chamber. The nozzle include a nozzle body including a substantially hollow interior and a substantially conical exterior portion having a nozzle half-cone angle. The nozzle body defines an exit orifice disposed on an end face of the nozzle. The exit orifice is defined by an orifice diameter (D), an orifice length (L), and a nozzle end face diameter (ϕ1). The shield includes a shield body defining a shield exit orifice diameter (ϕ2). The shield body includes a substantially conical interior portion having a shield half-cone angle, which is substantially equal to the nozzle half-cone angle. The shield is mounted in a spaced relation to the nozzle relative to the longitudinal axis such that a fluid passageway is formed in a space between the substantially conical interior portion of the shield and the substantially conical exterior portion of the nozzle. The nozzle half-cone angle, a L to D ratio, and a ϕ2 to ϕ1 ratio are selected to provide the plasma arc torch with effective cooling of the nozzle, protection from slag reflection, and a stable ionized plasma gas flow.

In another aspect, the invention features a consumable for a plasma arc torch. The consumable includes a first passageway for an ionized plasma fluid and a second passageway for a shield fluid. The first passageway is parallel to a longitudinal axis of the consumable. The first passageway includes a first exit orifice for ejecting the ionized plasma fluid. The second passageway includes a second exit orifice and is disposed at an angle to the first passageway such that the shield fluid impinges the plasma fluid after ejection at an angle selected to provide the plasma arc torch with effective cooling of a portion of the consumable, protection from slag reflection, and a stable ionized plasma fluid flow.

BRIEF DESCRIPTION OF THE DRAWINGS

In FIG. 3, the torch tip provides conical shield flow injection to the plasma gas flow.

DESCRIPTION

The present invention utilizes a conical nozzle exterior portion combined with a corresponding conical shield interior portion to form an angular (e.g., conical) impingement of a cooling fluid (e.g., a shield gas) flow on an ionized plasma gas flow. The angular shield flow impingement can be mathematically considered as two components (i.e., a columnar or x-component, and a perpendicular or y-component). The columnar component can aid in a reduction of ionized plasma gas instabilities, while the perpendicular component can provide protection from reflecting slag and effective nozzle cooling capabilities. By adjusting the angle of the angular flow, the ratio of the columnar and perpendicular components can be optimized to provide a highly stable ionized plasma gas flow and effective protection from slag reflection and nozzle cooling.

Figure 3:
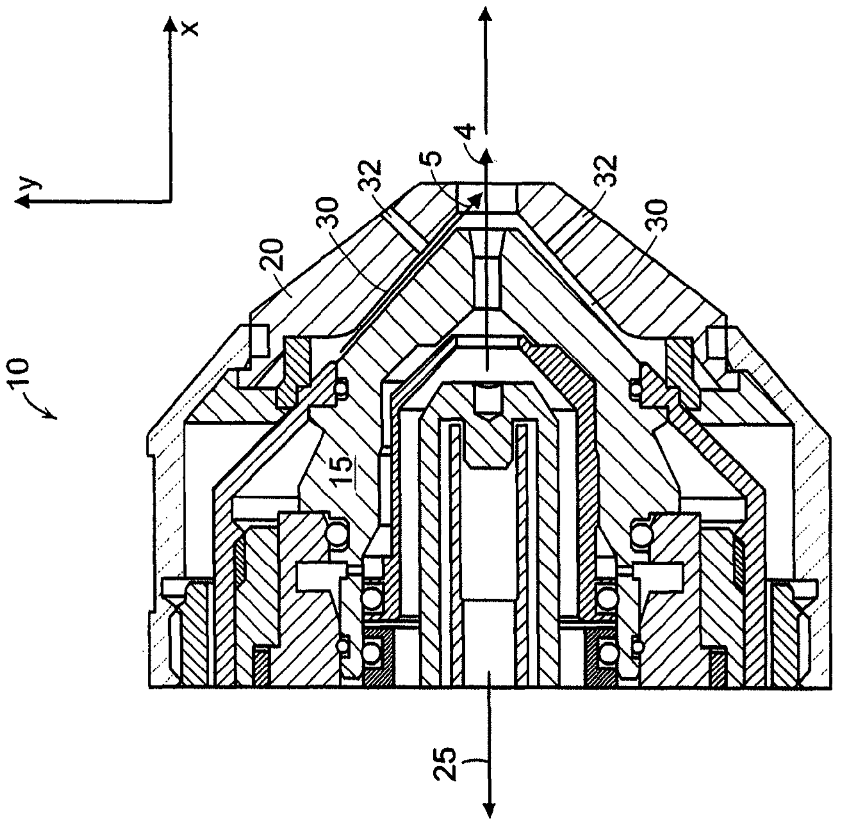
FIG. 3 is a cross-sectional view of a torch tip in accordance with one embodiment of the invention.

Referring to FIG. 3, a torch tip 10 includes a nozzle 15 and a shield 20, which are spaced from each other along a longitudinal axis 25 of the torch tip 10. Both the nozzle 15 and shield 20 are formed from electrically conductive materials. In some embodiments, both the nozzle and shield are formed of the same electrically conductive material and, in other embodiments, the nozzle and shield are formed of different electrically conductive materials. Examples of electrically conductive materials suitable for use with the invention include copper, aluminum, and brass.

Formed within the space between the nozzle 15 and the shield 20 is a passageway 30 for fluids. Fluids, such as for example, a shield gas, flow through the passageway 30 to cool the nozzle 15 during use. Fluids flowing through the passageway 30 impinge an ionized plasma gas stream flowing through nozzle 15. As a result, the plasma gas flow is provided with conical shield flow injection or, in other words, the shield gas has an angular flow in comparison to the plasma gas. The plasma gas flow and the shield gas flow are illustrated in FIG. 3 as arrows labeled 4 and 5, respectively. That is, the plasma gas flow is depicted as arrow 4 and the shield gas flow is depicted as arrow 5.

As shown in FIG. 3, the shield 15 can include one or more vent holes 32 to provide additional cooling (i.e., venting) to the nozzle 15. However, in some embodiments, the shield 15 does not include any vent holes.

Figure 2:
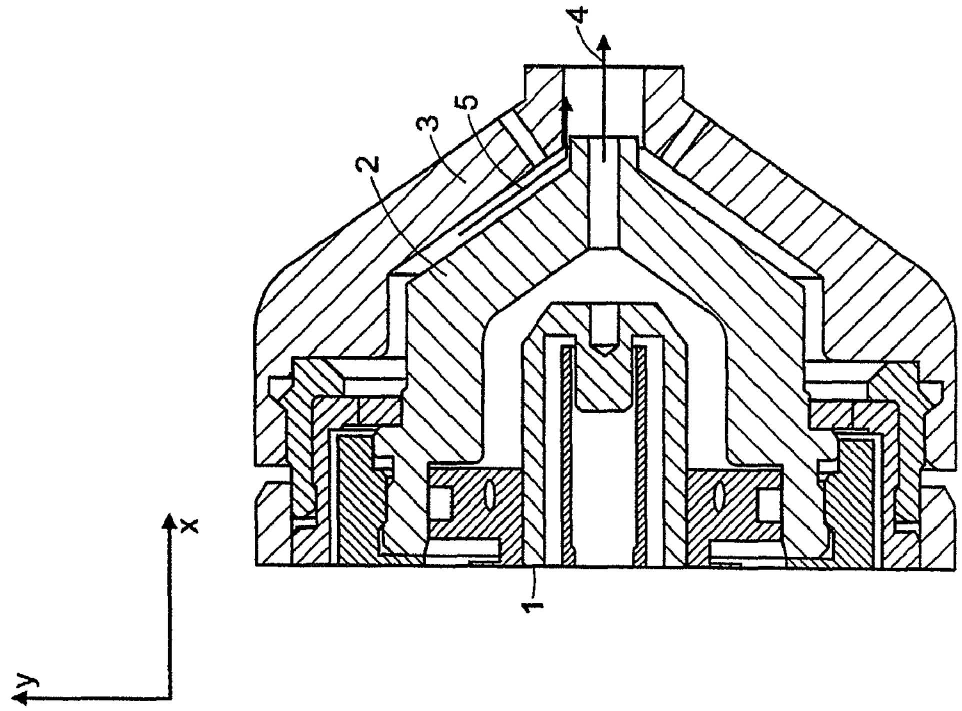
PRIOR ART FIG. 2
FIG. 2 is a cross-sectional view of the torch tip of another prior art plasma arc torch utilizing a columnar shield flow injection. That is, the shield flow is co-axial to the plasma gas flow.
Figure 1:
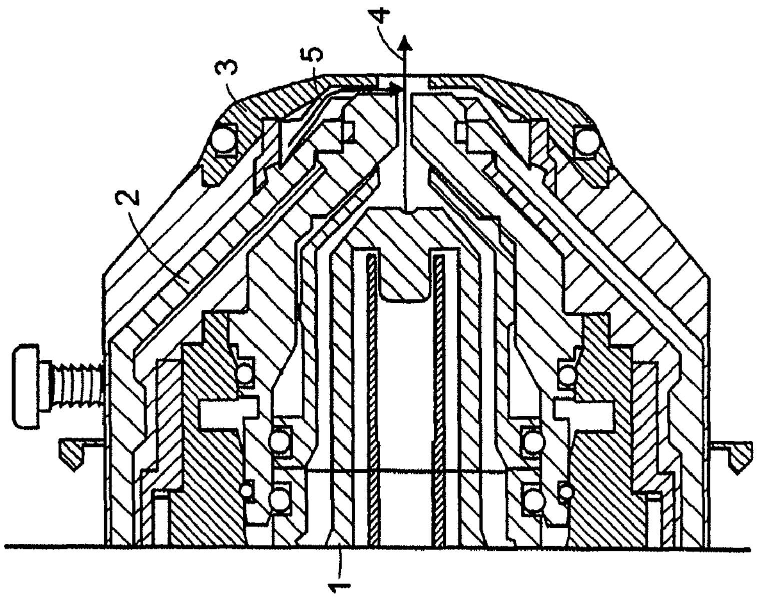
PRIOR ART FIG. 1
FIG. 1 is a cross-sectional view of a portion (i.e., a torch tip) of a prior art plasma arc torch utilizing a conventional 90 degree shield flow injection. That is, the shield flow impinges the plasma gas flow at a 90 degree angle.
Figure 4A:
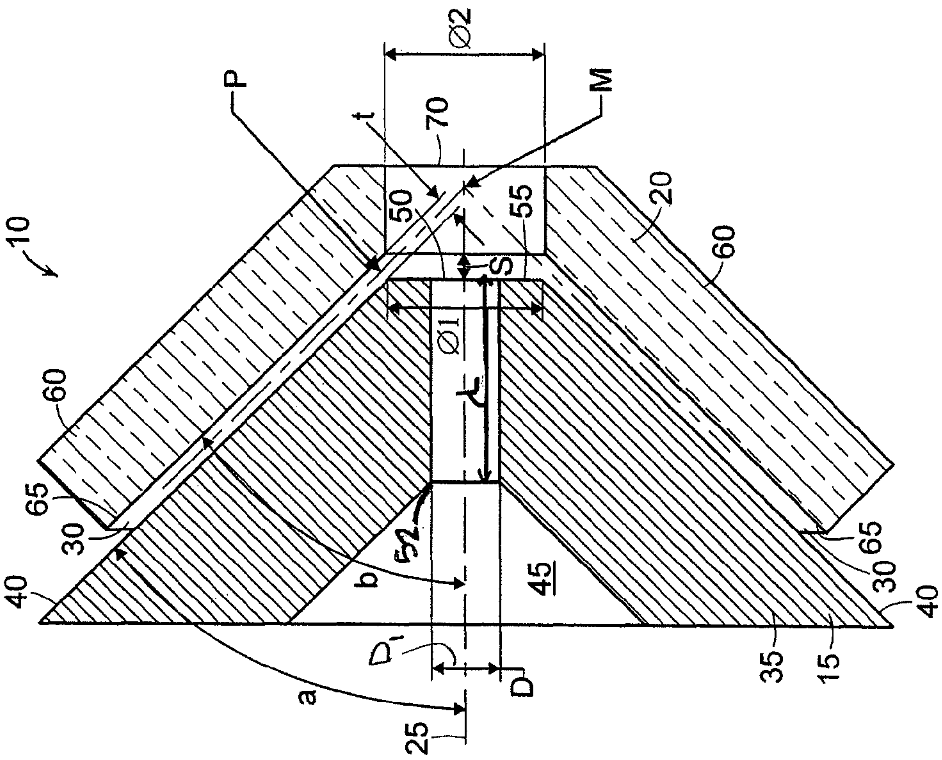
FIG. 4A is a schematic view of an end portion of a torch tip in accordance with one embodiment of the invention.

Referring to FIG. 4A, which shows a schematic view of an end portion of the torch tip 10, the nozzle 15 includes a nozzle body 35 including a substantially conical exterior portion 40 and a substantially hollow interior portion 45. As shown in FIG. 4A, the conical exterior portion 40 is defined by a nozzle half-cone angle (a), i.e., the angle formed between the longitudinal axis 25 and the conical exterior portion 40 of the nozzle 15. In general, the nozzle half-cone angle (a) can be varied so that the steepness of the exterior portion 40, and thus the passageway 30, can also be varied. In general, the larger the nozzle half-cone angle selected, the more likely that instabilities will be introduced when the fluid traveling through the passageway 30 impinges the ionized plasma gas flow. Thus, in some embodiments, it is preferred to select a nozzle half-cone angle within a range of about 20 degrees to about 60 degrees so as to limit the likelihood for generating an unstable ionized plasma gas flow.

The nozzle 15 also includes an exit orifice 50 located on an end face 55 of the nozzle 15. The ionized plasma gas flow generated in a plasma chamber (i.e., within a space defined between an electrode and the substantially hollow interior portion 45) flows through the exit orifice 50 out pass the shield 20 to a conductive workpiece for cutting, marking, and/or piercing purposes. The exit orifice 50 is defined by an orifice diameter (D), an orifice length (L), and a nozzle end face diameter (ϕ1).

Referring to FIGS. 4A, 4B, 4C, and 4D the orifice length (L) is the total length of a bore (i.e., a passageway) through the nozzle 15. That is, L is equal to the length of the bore as defined from a bore entrance 52 to an end of the bore in the end face 55 of the nozzle 15. The nozzle diameter (D), also known as the hydraulic diameter, is defined as the total area of the wall surrounding the bore divided by the product of the total length (L) of the bore and pi. In certain embodiments, such as the embodiment shown in FIG. 4A, the diameter of the bore remains constant along the entire length L. As a result, D is defined by the following equation:

$$D=(\pi D_1 L_1)/\pi L;\ \text{where } L_1=L.$$

Figure 4B:
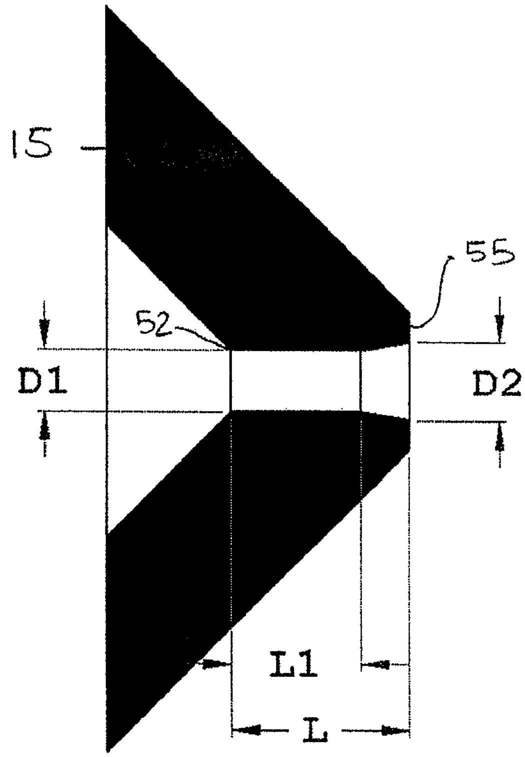
FIGS. 4B-4D are schematic views of an end portion of a torch tip in accordance with further embodiments of the invention.

However, in other embodiments, such as the embodiment illustrated in FIG. 4B, where the bore has a cylindrical section (i.e., a section having a constant diameter $D_1$ over a length $L_1$) and a conical section (i.e., a section wherein the diameter increases from its smallest diameter $D_1$ to its largest diameter D2), D is defined by the following equation:

$$D=(\pi D_1L_1+\pi/2(D_1+D_2)\mathrm{sqrt}(1/4(D_2-D_1)\hat{}2+(L-L_1)\hat{}2))/\pi L.$$

Figure 4C:
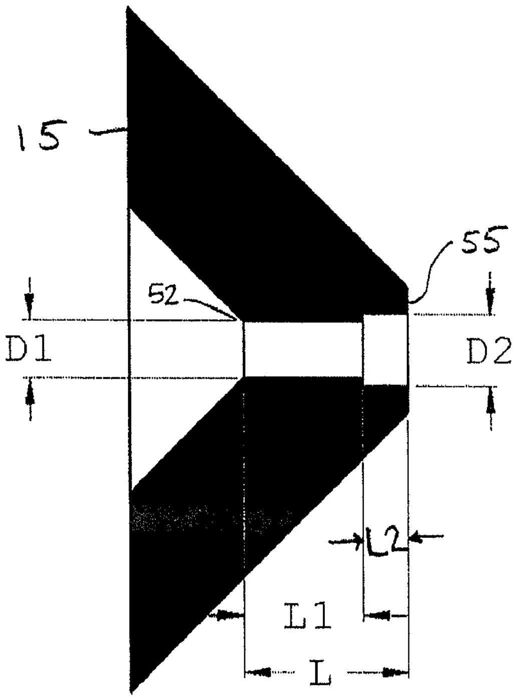

In the embodiment shown in FIG. 4C, the bore has two different cylindrical sections. The first cylindrical section extends along length $L_1$ and the second cylindrical section extends along $L_2$, wherein $L_1+L_2$ equal L. As a result, D is defined by the following equation:

$$D=(\pi D_1L_1+\pi D_2(L-L_1))/\pi L.$$

Figure 4D:
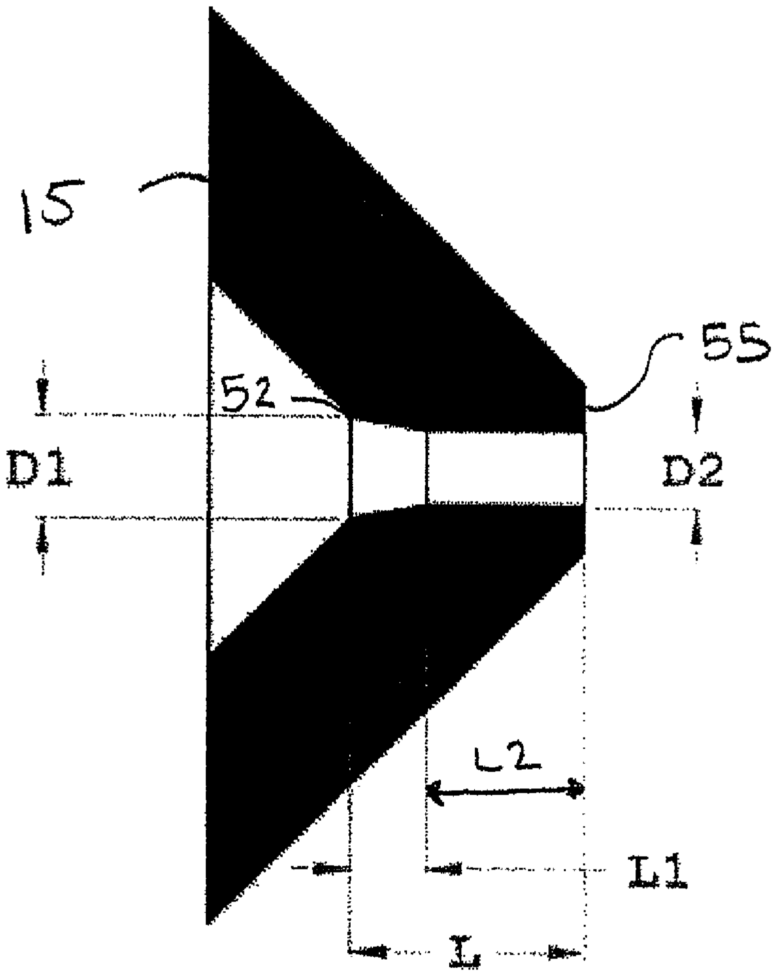

FIG. 4D illustrates an embodiment in which the diameter at the bore entrance 52 is greater than the diameter at the bore exit or end face 55 of the nozzle 15. In this embodiment, the bore geometry includes a first section in which the diameter is the largest, $D_1$, at the bore entrance 52 and decreases over a length $L_1$ to its smallest diameter, $D_2$. The bore also includes a second section in which the diameter is constant over the remaining length (i.e., $L-L_1$). As a result, D is defined by the following equation:

$$D=(\pi/2(D_1+D_2)\mathrm{sqrt}(1/4(D_2-D_1)\hat{}2+(L_1)\hat{}2)+\pi D_2(L-L_1))/\pi L.$$

While FIGS. 4A-4D show four possible bore geometries, other geometries are also possible.

Each of the values of D, L, and ϕ1 can be selected to provide optimal cutting, marking and/or piercing of a conductive workpiece by a plasma arc torch. For example, cutting speed and workpiece thickness can be increased by increasing a L to D ratio of the nozzle 15. In general, an L to D ratio (L/D) equal to greater than 2.4 has been associated with providing cutting speed and cut thickness benefits. However, in conventional nozzles, that use either columnar or perpendicular shield gas impingement, a L/D ratio greater than or equal to 2.4 was difficult to achieve due to overheating (i.e., excessive wear) of the nozzle or due to ionized plasma gas stability problems. The use of angular impingement of a cooling fluid with either a vented or non-vented nozzle minimizes the problems of prior art nozzles, while allowing the L/D ratio to be increased to a value of at least about 2.4. In some embodiments, the L/D ratio can be increased to a value within a range of about 2.5 to about 3.0, such as for example, 2.8.

Through experimentation and analysis, an optimum range of ratios has been determined between the nozzle end face diameter ϕ1 and the orifice diameter D. The ϕ1/D ratio is important because it aids in the determination of the location of a fluid flow (e.g., shield gas) merge point with the ionized plasma gas stream. The merge point is located at point M on FIG. 4, and point M's distance from the shield gas exit point, P will determine the extent of re-circulation of fluids near the exit orifice 50. As the amount of re-circulation increases, so does the likelihood of ionized plasma gas flow instabilities. Thus, in some embodiments, optimal cutting, piercing, or marking of a workpiece can be achieved by varying the locations of M and P. For example, as the ϕ1/D ratio approaches a value of 1 (and thus the distance between M and P is decreased), the end face of the nozzle gets too hot and limits nozzle life, which is undesirable. As this ratio is increased, the nozzle and the nozzle end face will run cooler, but the shield gas flow will be negatively effected because the distance between M and P will be increased, thereby leading to an increase in ionized plasma gas flow instabilities. In some embodiments, optimum values for the ϕ1/D ratio have been determined to be within a range of about 1.9 to about 2.5.

The shield 20 has a shield body 60 which is defined by a substantially conical interior portion 65 having a shield half-cone angle, b. Shield half-cone angle, b is substantially equal to (e.g., ±5 degrees) the nozzle half-cone angle, a, so that when the shield is mounted in a spaced relationship to the nozzle 15 along the longitudinal axis 25, the substantially conical exterior portion 40 of the nozzle and the substantially conical interior portion 65 of the shield form parallel walls of the passageway 30. As a result of the geometry of the passageway 30, fluids (e.g., shield gas) flowing through the passageway 30 stream out to angularly impinge the ionized plasma gas flow.

The shield body 60 includes a shield exit orifice 70, which is disposed adjacent to the exit orifice 50 of the nozzle 15 so that the ionized plasma gas flow, together with the shield fluid flow, can be directed towards a workpiece. The shield exit orifice is defined by a shield exit orifice diameter (ϕ2). In some embodiments, the shield exit orifice can have a similar size as the nozzle end face diameter ϕ1 in order to form a smooth shield fluid flow. If the ratio (ϕ2/ϕ1) is too small (i.e., 0.5 or less), an increase in fluid re-circulation can occur near the exit orifice 50 and as a result, an increase in instabilities will be observed. If the ratio of ϕ2/ϕ1 is too large (i.e., greater than 1.5) the nozzle end face 55 can be exposed to reflecting slag during torch use due to an overly large shield exit orifice 70. In certain embodiments, a ratio of ϕ2/ϕ1 ratio can be within a range of 0.8 to about 1.2, to provide effective protection against reflecting slag while still providing a stable ionized plasma gas flow.

Figure 5B:
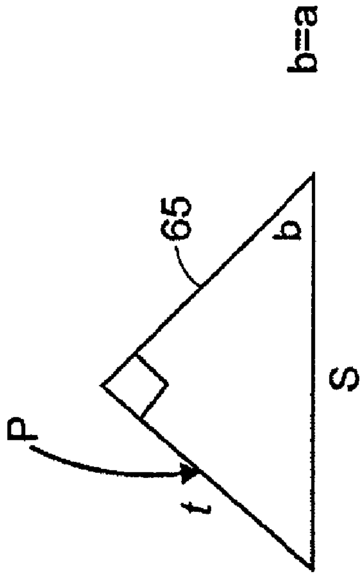
FIGS. 5A and 5B are enlarged schematic views of a portion of FIG. 4.
Figure 5A:
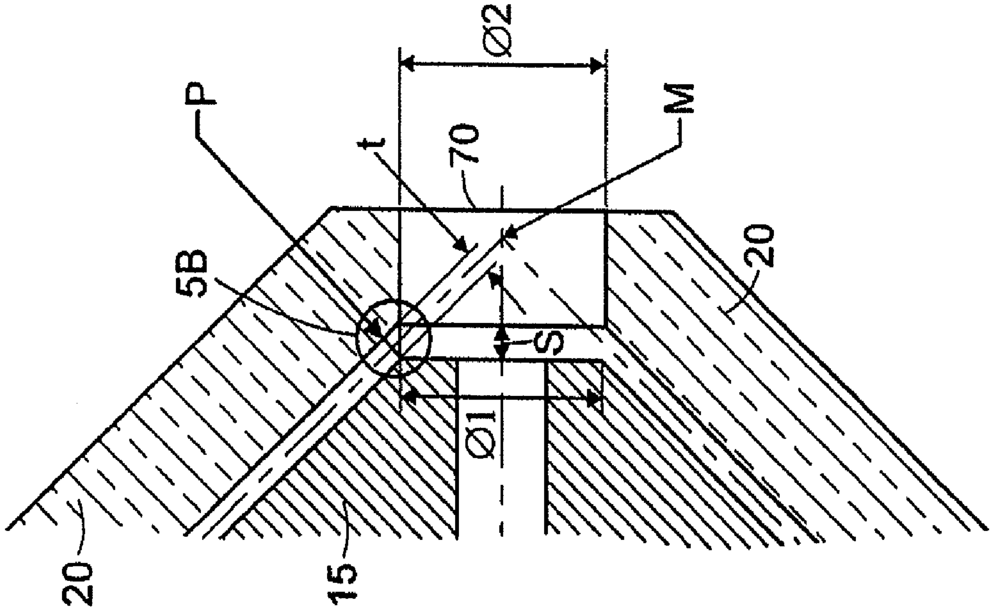

The velocity of the fluid traveling between the shield 20 and the nozzle 15 also has an impact on workpiece cutting, marking, and piercing results. For example, if the velocity of the shield gas is too low, the ability of the torch tip 10 to protect the nozzle 15 from reflecting slag is diminished. If the velocity is to high, instabilities will be introduced into the ionized plasma gas stream. Thus, in some embodiments, it is preferred to have the velocity of the fluid within passageway 30 traveling between about 2,000 inches per second to about 6,000 inches per second. The velocity of this fluid is determined, in part, by a thickness (t) of the passageway 30. The thickness of the passageway 30 in turn is determined by the distance (s) along the longitudinal axis 25 the nozzle 15 and shield are spaced. Referring to FIGS. 5A and 5B, the thickness (t) of the passageway 30 is equal to s*sin (a), where b=a. The velocity of the fluid (e.g., shield gas) at point P is equal to an effective flow rate of the fluid divided by the area at exit point P. The area at point P is equal to π*t*(ϕ1+t*cos(a)). Thus, the distance (s) and ultimately, the thickness of the passageway (t) will determine the velocity of the fluid traveling through passageway 30.

Figure 6:
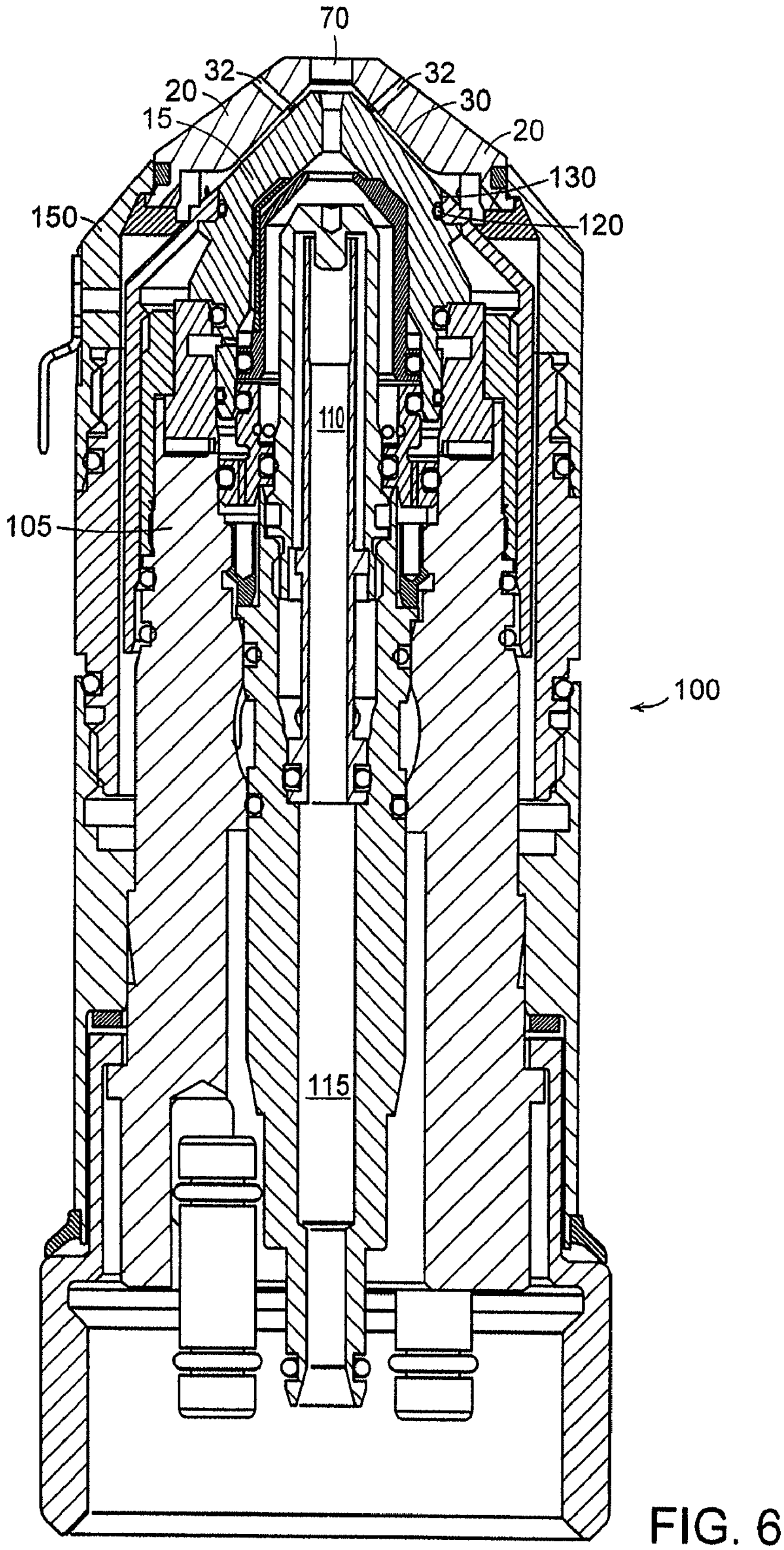
FIG. 6 is a cross-sectional view of a plasma arc torch including the torch tip of FIG. 3.

Referring to FIG. 6, the torch tip 10 can be attached to a plasma arc torch 100 including a torch body 105, an electrode 110, and a plasma gas passageway 115. The nozzle 15 of the torch tip 10 can be attached directly to the torch body 105 through a securing mechanism 120, such as, for example a pair of deformable o-rings or threads patterned on a surface 130 of the nozzle. In some embodiments, the shield 20 can be attached to the plasma arc torch 100 through a fastening mechanism, such as, for example, through the use of a retaining cap 150.

The following examples are provided to further illustrate and to facilitate the understanding of the invention. These specific examples are intended to be illustrative of the invention and are not intended to be limiting.

Example 1

A torch tip having a substantially conical exterior nozzle portion and a substantially conical interior shield portion was used to cut ¾ inch mild steel on a dross-free speed of up to 100 ipm. This same torch tip was used in combination with a plasma arc torch to pierce ⅜ inch, ½ inch, 1 inch, and 1¼ inch mild steel. Both the substantially conical exterior nozzle portion and the substantially conical interior shield portion had a half-cone angle of 42.5 degrees. Each of the shield and the nozzle were machined from copper and included o-rings to secure the torch tip to the plasma arc torch. The shield had twelve vent holes disposed therein to provide additional cooling.

The shield and the nozzle were mounted with respect to each other along the longitudinal axis at a distance of 0.0326 inches to form a passageway having a thickness of 0.022. The velocity of the shield gas (air) as it exited the passageway at point P was 4,100 inches per second. The exit orifice of the nozzle had a length L of 0.235 inches, a diameter D of 0.081 inches, and a nozzle end face diameter $\phi\mathbf{1}$ of 0.18 inches. As a result, the nozzle had a L/D of 2.8 and a $\phi\mathbf{1}$/D of 2.1. The shield had a shield exit orifice diameter of $\phi\mathbf{2}$ of 0.185 inches. Thus, the $\phi\mathbf{2}/\phi\mathbf{1}$ ratio of the torch tip was 1.03.

The torch tip described in this example was used with a HPR plasma arc torch available from Hypertherm, Inc. of Hanover, N. H. Results from various tests on different thickness of mild steel have shown that torch tips that provide angular impingement performed better than torch tips that provide columnar impingement. In fact, torch tips that provided columnar impingement were difficult to cool and were damaged when piercing workpieces having thickness of 1 inch or greater.

Example 2

Figure 7:
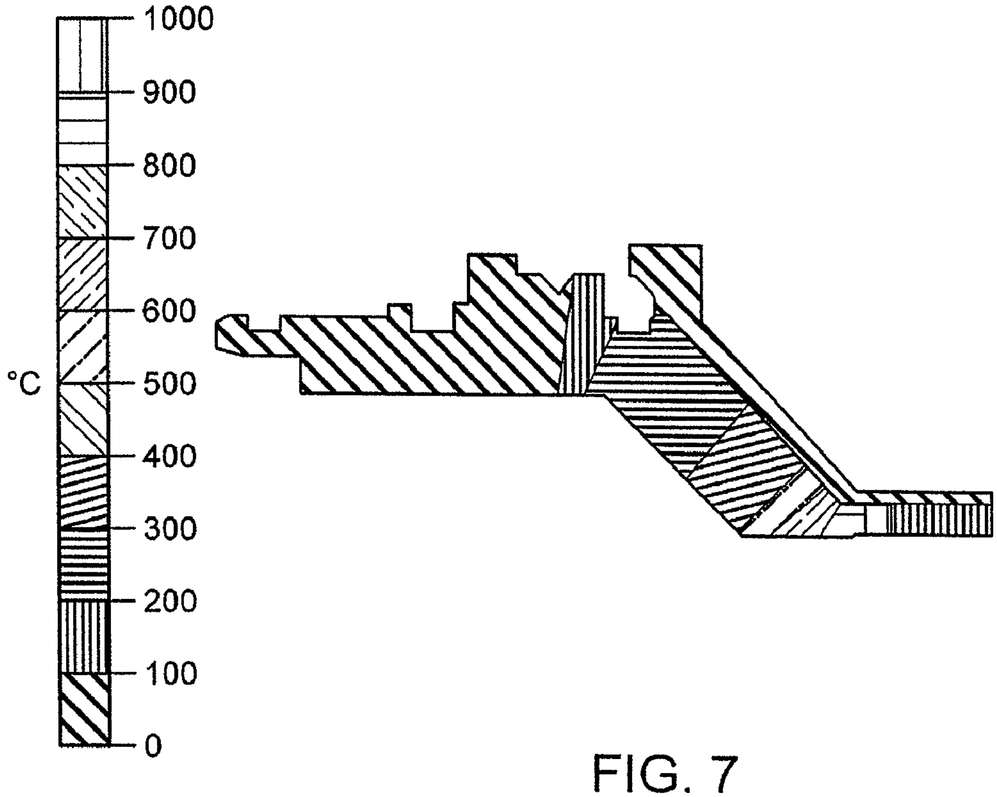
FIG. 7 is a cross-sectional view of a portion of the torch tip of FIG. 2 showing the results of thermal analysis.
Figure 8:
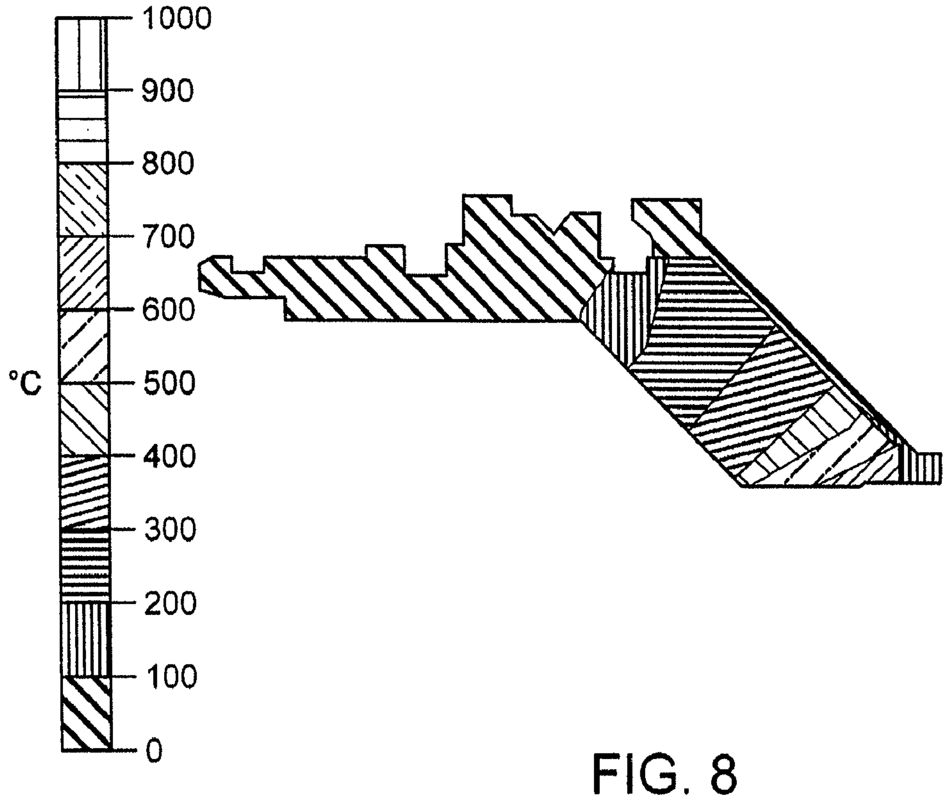
FIG. 8 is a cross-sectional view of a portion of the torch tip of FIG. 3 showing the results of thermal analysis.

A torch tip having a substantially conical exterior nozzle portion and a substantially conical interior shield portion was modeled using thermal analysis and the results were compared to a model of a conventional torch tip that provided columnar flow. Referring to FIGS. 7 and 8, FIG. 7 shows the thermal analysis results for the torch tip that provided columnar flow and FIG. 8 shows the thermal analysis results for the torch tip that provides angular flow of 42.5 degrees. Both the prior art torch tip and the torch tip of in accordance with the invention had a L/D of 2.6, a $\phi\mathbf{1}$/D of 2.1, and a $\phi\mathbf{2}/\phi\mathbf{1}$ of 1.03.

As shown in FIG. 7, the torch tip having columnar flow experiences a maximum temperature of 996 degrees C., whereas the torch tip providing angular flow (FIG. 8) experiences a maximum operating temper of 696 degrees C. under equal heat loading. As a result, the torch tip of the present invention provides better conduction of heat away from the nozzle during use. Thus, the nozzle of the present invention will experience less wear in use, thereby decreasing the frequency of needed maintenance.

Example 3

A torch tip having a substantially conical exterior nozzle portion and a substantially conical interior shield portion can be used to cut ¾ inch mild steel on a dross-free speed of up to 100 ipm. Both the substantially conical exterior nozzle portion and the substantially conical interior shield portion had a half-cone angle of 30 degrees. Each of the shield and the nozzle are machined from copper and include o-rings to secure the torch tip to the plasma arc torch. The shield has twelve vent holes disposed therein to provide additional cooling.

The shield and the nozzle are mounted with respect to each other along the longitudinal axis at a distance of 0.04 inches to form a passageway having a thickness of 0.020. The velocity of the shield gas (air) as it exited the passageway at point P is 2,500 inches per second. The exit orifice of the nozzle has a length L of 0.234 inches, a diameter D of 0.0867 inches, and a nozzle end face diameter $\phi\mathbf{1}$ of 0.18 inches. As a result, the nozzle has a L/D of 2.7 and a $\phi\mathbf{1}$/D of 2.07. The shield has a shield exit orifice diameter of $\phi\mathbf{2}$ of 0.162 inches. Thus, the $\phi\mathbf{2}/\phi\mathbf{1}$ ratio of the torch tip is 0.9.

Example 4

A torch tip having a substantially conical exterior nozzle portion and a substantially conical interior shield portion can be used to cut ¾ inch mild steel on a dross-free speed of up to 100 ipm. Both the substantially conical exterior nozzle portion and the substantially conical interior shield portion had a half-cone angle of 47 degrees. Each of the shield and the nozzle are machined from copper and include o-rings to secure the torch tip to the plasma arc torch. The shield has twelve vent holes disposed therein to provide additional cooling.

The shield and the nozzle are mounted with respect to each other along the longitudinal axis at a distance of 0.03 inches to form a passageway having a thickness of 0.022. The velocity of the shield gas (air) as it exited the passageway at point P is 5,000 inches per second. The exit orifice of the nozzle has a length L of 0.234 inches, a diameter D of 0.0867 inches, and a nozzle end face diameter $\phi\mathbf{1}$ of 0.208 inches. As a result, the nozzle has a L/D of 2.7 and a $\phi\mathbf{1}$/D of 2.4. The shield has a shield exit orifice diameter of $\phi\mathbf{2}$ of 0.229 inches. Thus, the $\phi\mathbf{2}/\phi\mathbf{1}$ ratio of the torch tip is 1.1.

While a number of exemplary embodiments have been discussed, other embodiments are also possible. For example, while the nozzle 15 and the shield 20 have been described as separate parts, in some embodiments, the nozzle 15 and shield 20 can be formed as a single, replaceable part. As a result, during maintenance of a plasma arc torch in accordance with the present invention, the entire torch tip 10 can be replaced as a single part. In other embodiments, the shield 20 and nozzle 15 are separate parts and can be replaced separately or at different times in accordance with their wear. As another example of possible embodiments, the torch tip 10 can be connected to a plasma arc torch 100 through a number of different means. For example, both the nozzle 15 and the shield can include threading to mate with threads patterned on the torch body or surrounding enclosure. In other embodiments, deformable elements, such as o-rings can be used to attach the shield and nozzle to the plasma arc torch. In addition, the nozzle 15 and shield 20 can use different means to attach to the plasma arc torch 100.

Variations, modifications, and other implementations of what is described herein will occur to those of ordinary skill in the art without departing from the spirit and the scope of the invention. Accordingly, the invention is not to be limited only to the preceding illustrative descriptions.

The invention claimed is:

1. A nozzle for a plasma arc torch, the nozzle comprising:

a nozzle body including a substantially hollow interior and a substantially conical exterior portion, the substantially conical exterior portion having a nozzle half-cone angle selected from a first range of about 20 degrees to about 60 degrees, the nozzle body defining an exit orifice disposed on an end face of the nozzle, the exit orifice being defined by an orifice diameter (D), an orifice length (L), and a nozzle end face diameter (ϕ1), wherein a L to D ratio is greater than or equal to 2.4, and a (ϕ1) to D ratio is within a second range of about 1.9 to about 2.5.

2. The nozzle according to claim 1, wherein the first range is between about 30 degrees to about 50 degrees.

3. The nozzle according to claim 1, wherein the first range is between about 34 degrees to about 44 degrees.

4. The nozzle according to claim 1, wherein the nozzle half-cone angle is about 42.5 degrees.

5. The nozzle according to claim 1, wherein the L to D ratio is between about 2.5 and about 3.0.

6. The nozzle according to claim 5, wherein the L to D ratio is about 2.8.

7. The nozzle according to claim 1, wherein ϕ1 to D ratio is about 2.1.

8. The nozzle according to claim 1, wherein the nozzle body further includes a securing mechanism for securing the nozzle body to a plasma torch body.

9. The nozzle according to claim 1, wherein the nozzle body is formed from an electrically conductive material.

10. A plasma arc torch having a longitudinal axis, the plasma arc torch comprising:

a plasma arc torch body including a plasma flow path for directing a plasma gas to a plasma chamber in which a plasma arc is formed;

the nozzle of claim 1; and a shield comprising a shield body defining a shield exit orifice having a shield exit orifice diameter (ϕ2), the shield body including a substantially conical interior portion having a shield half-cone angle, the shield cone half-angle being substantially equal to the nozzle half-cone angle, the shield being mounted in a spaced relation to the nozzle relative to the longitudinal axis of the plasma arc torch such that a fluid passageway is formed in a space between the substantially conical interior portion of the shield and the substantially conical exterior portion of the nozzle.

11. The plasma arc torch according to claim 10, wherein the shield is spaced along the longitudinal axis from the nozzle at a distance (s) and the passageway has a thickness defined by s multiplied by sine of the nozzle half-cone angle.

12. The plasma arc torch according to claim 11, wherein a value of s is selected to provide a thickness that results in a shield exit fluid velocity of about 2000 inches per second to about 6000 inches per second.

13. The plasma arc torch according to claim 11, wherein a value of s is selected to provide a thickness of about 0.022 inches.

14. The plasma arc torch according to claim 10, wherein the nozzle has a ϕ1 to D ratio within a second range of about 1.9 to about 2.5.

15. The plasma arc torch according to claim 14, wherein the ϕ1 to D ratio is about 2.1.

16. The plasma arc torch according to claim 10, wherein the first range is between about 30 degrees to about 50 degrees.

17. The plasma arc torch according to claim 10, wherein the first range is between about 34 degrees to about 44 degrees.

18. The plasma arc torch according to claim 10, wherein the nozzle half-cone angle is about 42.5 degrees.

19. The plasma arc torch according to claim 10, wherein the L to D ratio is between about 2.5 and about 3.0.

20. The plasma arc torch according to claim 10, wherein the L to D ratio is about 2.8.

21. The plasma arc torch according to claim 10, wherein the plasma arc torch further comprises a ϕ2 to ϕ1 ratio between about 0.8 and about 1.2.

22. The plasma arc torch according to claim 21, wherein the ϕ2 to ϕ1 ratio is greater than 1.

23. The plasma arc torch according to claim 10, wherein the shield body further includes one or more vent holes.

24. The plasma arc torch according to claim 10, wherein the nozzle body further includes a securing mechanism for securing the nozzle body to a plasma torch body.

25. The plasma arc torch according to claim 10, wherein the nozzle body is formed from an electrically conductive material.

26. The plasma arc torch according to claim 10, wherein the shield body is formed from an electrically conductive material.

27. A torch tip for a plasma arc torch, the torch tip having a longitudinal axis and comprising:

a nozzle comprising a nozzle body including a substantially hollow interior and a substantially conical exterior portion, the substantially conical exterior portion having a nozzle half-cone angle selected from a first range of about 20 degrees to about 60 degrees, the nozzle body defining an exit orifice disposed on an end face of the nozzle, the exit orifice being defined by an orifice diameter (D), an orifice length (L), and a nozzle end face diameter (ϕ1), wherein a L to D ratio is greater than or equal to 2.4; and a shield comprising a shield body defining a shield exit orifice having a shield exit orifice diameter (ϕ2), the shield body including a substantially conical interior portion having a shield half-cone angle, the shield half-cone angle being substantially equal to the nozzle half-cone angle, the shield being mounted in a spaced relation to the nozzle relative to the longitudinal axis of the torch tip such that a fluid passageway is formed in a space between the substantially conical interior portion of the shield and the substantially conical exterior portion of the nozzle.

28. The torch tip according to claim 27, wherein the shield is spaced along the longitudinal axis from the nozzle at a distance (s) and the passageway has a thickness defined by s multiplied by sine of the nozzle half-cone angle.

29. The torch tip according to claim 28, wherein a value of s is selected to provide a thickness that results in a shield exit fluid velocity of about 2000 inches per second to about 6000 inches per second.

30. The torch tip according to claim 28, wherein a value of s is selected to provide a thickness of about 0.022 inches.

31. The torch tip according to claim 27, wherein the nozzle has a ϕ1 to D ratio within a second range of about 1.9 to about 2.5.

32. The torch tip according to claim 31, wherein the ϕ1 to D ratio is about 2.1.

33. The torch tip according to claim 27, wherein the first range is between about 30 degrees to about 50 degrees.

34. The torch tip according to claim 27, wherein the first range is between about 34 degrees to about 44 degrees.

35. The torch tip according to claim 27, wherein the nozzle half-cone angle is about 42.5 degrees.

36. The torch tip according to claim 27, wherein the L to D ratio is between about 2.5 and about 3.0.

37. The torch tip according to claim 27, wherein the L to D ratio is about 2.8.

38. The torch tip according to claim 27, wherein the torch tip further comprises a ϕ2 to ϕ1 ratio between about 0.8 and about 1.2.

39. The torch tip according to claim 38, wherein the ϕ2 to ϕ1 ratio is greater than 1.

40. The torch tip according to claim 27, wherein the shield body further includes one or more vent holes.

41. The torch tip according to claim 27, wherein the nozzle body further includes a securing mechanism for securing the nozzle body to a plasma torch body.

42. The torch tip according to claim 27, wherein the nozzle body is formed from an electrically conductive material.

43. The torch tip according to claim 27, wherein the shield body is formed from an electrically conductive material.

44. A plasma arc torch having a longitudinal axis, the plasma arc torch comprising:

a plasma arc torch body including a plasma flow path for directing a plasma gas to a plasma chamber in which a plasma arc is formed; and the torch tip of claim 27, wherein the nozzle half-cone angle, a L to D ratio, and a ϕ2 to ϕ1 ratio are selected to provide the plasma arc torch with effective cooling of the nozzle, protection from slag reflection, and a stable ionized plasma gas flow.

* * * * *